United States Patent
Sabottke et al.

(10) Patent No.: US 7,951,224 B2
(45) Date of Patent: May 31, 2011

(54) PROCESS FOR IMPROVING THE CETANE RATING OF DISTILLATE AND DIESEL BOILING RANGE FRACTIONS

(75) Inventors: Craig Y. Sabottke, Chalmette, LA (US);
Stuart S. Shih, Gainesville, VA (US);
Bal Krishan Kaul, Fairfax, VA (US);
Fred Y. Lo, Green Brook, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 166 days.

(21) Appl. No.: 12/317,514

(22) Filed: Dec. 24, 2008

(65) Prior Publication Data
US 2010/0155332 A1    Jun. 24, 2010

(51) Int. Cl.
*B01D 15/00*    (2006.01)
(52) U.S. Cl. .............. 95/50; 95/45; 210/640; 585/118; 585/119
(58) Field of Classification Search ............ 210/640, 210/500.39; 95/45, 50, 49; 585/118, 119; 208/208 R, 301, 302, 209; 502/4; 528/272
See application file for complete search history.

(56) References Cited

U.S. PATENT DOCUMENTS

| | | | |
|---|---|---|---|
| 2,930,754 A | 3/1960 | Stuckey | |
| 2,947,687 A | 8/1960 | Lee | |
| 2,958,656 A | 11/1960 | Stuckey | |
| 3,140,256 A | 7/1964 | Martin et al. | |
| 3,370,102 A | 2/1968 | Carpenter et al. | |
| 4,115,465 A | 9/1978 | Elfert et al. | |
| 4,837,054 A | 6/1989 | Schucker | |
| 4,861,628 A | 8/1989 | Schucker | |
| 4,914,064 A | 4/1990 | Schucker | |
| 4,929,357 A | 5/1990 | Schucker | |
| 4,929,358 A | 5/1990 | Koenitzer | |
| 4,946,594 A | 8/1990 | Thaler et al. | |
| 4,962,270 A | 10/1990 | Feimer et al. | |
| 4,962,271 A | 10/1990 | Black et al. | |
| 4,975,178 A | 12/1990 | Clem et al. | |
| 4,990,275 A | 2/1991 | Ho et al. | |
| 5,012,036 A * | 4/1991 | Sartori et al. | 585/819 |
| 5,095,171 A * | 3/1992 | Feimer et al. | 585/819 |
| 5,098,570 A | 3/1992 | Schucker | |
| 5,130,017 A | 7/1992 | Schucker | |
| 5,203,988 A | 4/1993 | Swan, III et al. | |
| 5,211,838 A | 5/1993 | Staubs et al. | |
| 5,221,481 A | 6/1993 | Schucker | |
| 5,254,795 A * | 10/1993 | Boucher et al. | 585/819 |
| 5,290,452 A | 3/1994 | Schucker | |
| 5,416,259 A | 5/1995 | Darnell et al. | |
| 5,635,055 A | 6/1997 | Sweet et al. | |
| 5,643,442 A * | 7/1997 | Sweet et al. | 208/302 |
| 5,756,643 A * | 5/1998 | Ho et al. | 528/272 |
| 6,187,987 B1 * | 2/2001 | Chin et al. | 585/819 |
| 6,190,540 B1 * | 2/2001 | Lokhandwala et al. | 208/209 |
| 6,497,812 B1 * | 12/2002 | Schinski | 208/131 |

(Continued)

FOREIGN PATENT DOCUMENTS

EP    0 343 920 B1    10/1993

*Primary Examiner* — Ana M Fortuna

(57) ABSTRACT

The present invention is directed to a process for producing a diesel fuel of enhanced cetane value from low cetane distillate and diesel boiling range fractions from poor crudes such as naphthenic crudes.

9 Claims, 1 Drawing Sheet

U.S. PATENT DOCUMENTS

| | | | | |
|---|---|---|---|---|
| 6,649,061 B2* | 11/2003 | Minhas et al. | | 210/640 |
| 6,702,945 B2* | 3/2004 | Saxton et al. | | 210/649 |
| 7,267,761 B2* | 9/2007 | Balko | | 208/208 R |
| 7,314,565 B2* | 1/2008 | Sabottke et al. | | 210/640 |
| 2008/0035566 A1 | 2/2008 | Sabottke et al. | | |
| 2008/0035571 A1 | 2/2008 | Sabottke et al. | | |
| 2008/0035572 A1 | 2/2008 | Sabottke et al. | | |
| 2008/0035574 A1 | 2/2008 | Sabottke et al. | | |
| 2010/0155332 A1* | 6/2010 | Sabottke et al. | | 210/640 |

* cited by examiner

PROCESS FOR IMPROVING THE CETANE RATING OF DISTILLATE AND DIESEL BOILING RANGE FRACTIONS

BACKGROUND OF THE INVENTION

1. Field of the Invention

The present invention relates to a process to increase the cetane rating of distillate and diesel boiling range fractions.

2. Description of the Related Art

The use of membrane separation processes to divide feed streams into permeate streams and retentate streams of different chemical composition is well known in the art.

The removal of aromatic hydrocarbons from feed streams containing mixtures of aromatic hydrocarbons and non-aromatic hydrocarbons using membranes is a desirable process which has been described in the patent literature.

U.S. Pat. No. 2,947,687 teaches the separation of hydrocarbons by type through a non-porous membrane using a membrane solvent to enhance the permeation rate. Membrane solvents include substituted hydrocarbons which are soluble in and have solvent power for the permeate of the membrane. The hydrocarbon solvent is an organic compound containing one or more atoms of halogen, oxygen, sulfur or nitrogen. Thus, materials such as carbontetrachloride, alcohols, ketones, esters, ethers, carboxylic acids, mercaptans, sulfides (e.g., diethylsulfide, etc.), nitropropane, nitrobenzene, acetonitrile, formamide, ethylene diamine, etc. may be employed in an amount ranging from 1 to 100% based on total solvent to hydrocarbon feed. The process may be operated at a pressure differential between the feed and permeate zone with a permeate being removed by vacuum. Alternately, the permeate can be removed by a sweep stream such as steam, air, butane, etc.

The membrane is non-porous and includes natural or synthetic rubber, vinyl polymers, cellulose esters, cellulose ethers.

The process can use any hydrocarbon source as feed and the separation achieved is in the order: saturated hydrocarbons, <unsaturated hydrocarbons, <aromatics. Saturated hydrocarbons of approximately the same boiling range permeate in the order of increasing selectivity: branched chain, <cyclic-chain, <straight chain configuration; i.e., straight chain paraffins more readily permeate through the membrane.

U.S. Pat. No. 3,140,256 teaches a membrane separation process employing a membrane comprised of a cellulose derivative (e.g., cellulose ester or ether) modified by reaction with aldehydes, organic diisocyanate, organic monoisocyanate, organo-phosphorus chlorides and organo-sulfur chlorides. Hydrocarbon feeds can be separated into these components by type using the membrane; e.g., aromatics can be separated from unsaturated hydrocarbon (olefins or diolefins) and/or from paraffins, or branched chain aliphatic hydrocarbons can be separated from other aliphatic hydrocarbons which have a different number of branched chains. Aromatic hydrocarbons permeate more rapidly than do the saturated (i.e., paraffinic) hydrocarbons. In an example, methyl cyclohexane permeated through the membrane more selectively than did isooctane.

U.S. Pat. No. 3,370,102 teaches the membrane separation of aromatics from saturates in a wide variety of feed mixtures including various petroleum fractions, naphthas, oils, and other hydrocarbon mixtures. Expressly recited in '102 is the separation of aromatics from kerosene. The process produces a permeate stream and a retentate stream and employs a sweep liquid to remove the permeate from the face of the membrane to thereby maintain the concentration gradient driving force. U.S. Pat. No. 2,958,656 teaches the separation of hydrocarbons by type; i.e., aromatics, unsaturated, saturated by permeating a portion of the mixture through a non-porous cellulose ether membrane and removing permeate from the permeate side of the membrane using a sweep gas or liquid. Feeds include hydrocarbon mixtures (including virgin naphtha, naphtha from thermal or catalytic cracking, etc.) U.S. Pat. No. 2,930,754 teaches a method for separating hydrocarbons by type; i.e., aromatics and/or olefins from gasoline boiling range mixtures by the selective permeation of the aromatics through certain cellulose ester non-porous membranes. The permeated hydrocarbons are continuously removed from the permeate zone using a sweep gas or liquid. U.S. Pat. No. 4,115,465 teaches the use of polyurethane membranes to selectively separate aromatics from saturates via pervaporation.

Polyurea/urethane membranes and their use for the separation of aromatics from non-aromatics are the subject of U.S. Pat. No. 4,914,064. In that case the polyurea/urethane membrane is made from a polyurea/urethane polymer characterized by possessing a urea index of at least about 20% but less than 100%, an aromatic carbon content of at least about 15 mole percent, a functional group density of at least about 10 per 1000 grams of polymer, and a C=O/NH ratio of less than about 8.0. The polyurea/urethane multi-block copolymer is produced by reacting dihydroxy or polyhydroxy compounds, such as polyethers or polyesters having molecular weights in the range of about 500 to 5,000 with aliphatic, alkylaromatic or aromatic diisocyanates to produce a prepolymer which is then chain extended using diamines, polyamines or amino alcohols. The membranes are used to separate aromatics from non-aromatics under perstraction or pervaporation conditions.

Thin film compositions can be prepared either from suspension deposition as taught in U.S. Pat. No. 4,861,628 or from solution deposition as taught in U.S. Pat. No. 4,837,054.

The use of polyurethane imide membranes for aromatics from non-aromatics separations is disclosed in U.S. Pat. No. 4,929,358. The polyurethane-imide membrane is made from a polyurethane-imide copolymer produced by end capping a polyol such as a dihydroxy or polyhydroxy compound (e.g., polyether or polyester) with a di- or polyisocyanate to produce a prepolymer which is then chain extended by reaction of said prepolymer with a di- or polyanhydride with a di- or polycarboxylic acid to produce a polyurethane/imide. The aromatic/non-aromatic separation using said membrane is preferably conducted under perstraction or pervaporation conditions.

A polyester imide copolymer membrane and its use for the separation of aromatics from non-aromatics is the subject of U.S. Pat. No. 4,946,594. In that case the polyester imide is prepared by reacting polyester diol or polyol with a dianhydride to produce a prepolymer which is then chain extended preferably with a diisocyanate to produce the polyester imide.

U.S. Pat. No. 4,929,357 is directed to non-porous isocyanate cross-linked polyurethane membranes. The membrane can be in the form of a symmetric dense film membrane. Alternatively, a thin, dense layer of isocyanurate cross-linked polyurethane can be deposited on a porous backing layer to produce a thin film composite membrane. The isocyanurate cross-linked polyurethane membrane can be used to separate aromatic hydrocarbons from feed streams containing mixtures of aromatic hydrocarbons and non-aromatic hydrocarbons, the separation process being conducted under reverse osmosis, dialysis, perstraction or pervaporation conditions, preferably under perstraction conditions.

U.S. Pat. No. 4,962,271 teaches the selective separation of multi-ring aromatic hydrocarbons from distillates by perstraction. The multi-ring aromatics are characterized by having less than 75 mole % aromatic carbon content. Perstractive separation is through any selective membrane, preferably the aforesaid polyurea/urethane, polyurethane imides or polyurethane isocyanurates.

U.S. Pat. No. 4,990,275 relates to a copolymer composition comprising a hard segment of a polyimide and a soft segment of an oligomeric aliphatic polyester. Membranes made from the copolymer are useful for aromatic/saturates separations. The polyimide is derived from a dianhydride having between 8 and 20 carbons and a diamine having between 2 and 30 carbons while the oligomeric aliphatic polyester is a polyadipate, polysuccinate, polymalonate, polyoxalate or polyglutarate.

U.S. Pat. No. 4,962,270 teaches the improved separation of feed streams containing multiple components affected by means of a multi-membrane staged pervaporation process wherein each membrane stage in series is run at progressively higher temperature, stronger vacuum or both than the preceding stage. This process is especially useful for separating components from wide boiling range mixtures. The separation of a multi-component feed mixture of aromatic hydrocarbons and non-aromatic hydrocarbons is specifically mentioned.

U.S. Pat. No. 5,095,171 teaches that the separation of aromatic hydrocarbons from mixtures of aromatic and non-aromatic hydrocarbon feeds under pervaporation conditions is improved by the control of the amount of oxygen present in the feed. The amount of oxygen in the feed, such as heavy cat naphtha or other cracked feed, should be less than 30 wppm, preferably less than 10 wppm. The oxygen level in the feed can be controlled by the addition of small amounts of oxygen scavenger into the feed. Hindered phenols are representative of useful oxygen scavengers. Hydrocarbon feeds which can be subjected to the control of oxygen content include any cracked feed including by way of example light cat naphtha, intermediate cat naphtha, heavy cat naphtha, jet fuel, diesel fuel, coker gas oil, in general any cracked stock boiling in the 65° to 1050° F. range.

U.S. Pat. No. 5,098,570 is directed to a multi-block polymeric material comprising an urea prepolymer chain extended with a second compatible prepolymer selected from the group of prepolymers comprising (a) an (A) dianhydride or its corresponding tetraacid or diacid-diester combined with a monomer selected from (B) epoxy, diisocyanate, polyester, and diamine in an A/B mole ratio ranging from about 2.0 to 1.05, preferably about 2.0 to 1.1, and (b) an (A) diamine combined with a monomer selected from (B) epoxy and dianhydride or its corresponding tetraacid or diacid-diester in an A/B mole ratio ranging from about 2.0 to 1.05, preferably about 2.0 to 1.1, and mixtures thereof. It is also directed to membranes of the above-recited multi-block polymeric material, especially membranes comprising them, dense films of said multi-block polymeric material deposited on a microporous support layer producing a thin film composite membrane. The membranes of the multi-block polymeric material, especially the thin film composite membranes, are useful for separating aromatic hydrocarbons from mixtures of same with non-aromatic hydrocarbons under perstraction or pervaporation conditions.

U.S. Pat. No. 5,130,017 is directed to a multi-block polymeric material comprising a first amide acid prepolymer, made by combining (A) a diamine with (B) a dianhydride or its corresponding tetraacid or diacid-diester in an A/B mole ratio ranging from about 2.0 to 1.05, preferably about 2.0 to 1.1, chain extended with a second, different, compatible prepolymer selected from the group of prepolymers comprising (A) a dianhydride or its corresponding tetraacid or diaciddiester combined with a monomer selected from (B) epoxy, diisocyanate and polyester in an A/B mole ratio ranging from about 2.0 to 1.05, preferably about 2.0 to 1.1.

It is also directed to membranes of the above-recited multiblock polymeric materials, especially membranes comprising thin, dense films of said multi-block polymeric material deposited on a microporous support layer producing a thin film composite membrane.

The membranes of the multi-block polymeric material, especially the thin film composite membranes, are useful for separating aromatic hydrocarbons from mixtures of same with non-aromatic hydrocarbons under perstraction or pervaporation conditions. Suitable feed streams for aromatics from saturates separation are heavy cat naphtha, intermediate cat naphtha (200-320° F.), light aromatics content streams boiling in the $C_5$-300° F. range, light catalytic cycle oil boiling in the 400-650° F. range, reformate streams as well as streams in chemical plants which contain recoverable quantities of benzene, toluene, xylene (BTX) or other aromatics in combination with saturates.

U.S. Pat. No. 5,221,481 is directed to a multi-block polymeric material comprising an ester prepolymer chain extended with a second, different, compatible prepolymer selected from the group of prepolymers comprising (a) an (A) dianhydride or its corresponding tetraacid or diacid-diester combined with a monomer selected from (B) epoxy, diisocyanate, polyester, and diamine in an A/B mole ratio ranging from about 2.0 to 1.05, preferably about 2.0 to 1.1; and (b) an (A) diamine combined with a monomer selected from (B) epoxy, diisocyanate, and dianhydride or its corresponding tetraacid or diacid-diester in an A/B mole ratio ranging from about 2.0 to 1.05, preferably about 2.0 to 1.1, and mixtures thereof. It is also directed to membranes of the above-recited multi-block polymeric materials, especially membranes comprising thin, dense films of said multi-block polymeric material deposited on a microporous support layer producing a thin film composite membrane. The membranes of the multi-block polymeric material, especially the thin film composite membranes, are useful for separating aromatic hydrocarbons from mixtures of same with non-aromatic hydrocarbons under perstraction or pervaporation conditions.

U.S. Pat. No. 5,290,452 is directed to a polyester/amide membrane, its preparation and its use for organic liquid separation. The polyester/amide membrane is made by reacting a dianhydride with a polyester diol in a 2:1 to 1.05:1 mole ratio to end cap the diol to produce a prepolymer which is reacted with excess thionyl chloride to convert all of the unreacted anhydride and all carboxylic acid groups to acid chloride groups. The resulting acid chloride derivative is dissolved in organic solvent and interfacially reacted with a diamine dissolved in an aqueous solvent. The excess solutions are removed and the resulting thin film membrane is dried. The membranes are useful for organic liquid separations, especially the separation of aromatic hydrocarbons from mixtures of same with non-aromatic hydrocarbons, preferably under perstraction or pervaporation conditions.

U.S. Pat. No. 5,416,259 teaches that the pervaporative treatment of hydrocarbon feeds which have been exposed to air or oxygen and which contain mixtures of aromatic and non-aromatic hydrocarbons to selectively separate the feed into an aromatics-rich stream and a non-aromatics-rich stream is improved by the step of pretreating the hydrocarbon feed over an adsorbent such as attapulgite clay.

U.S. Pat. No. 5,635,055 teaches that the yield and quality of products secured from cracking units is increased by the process of subjecting the product stream secured from such cracking unit to a selective aromatics removal process and recycling the recovered aromatics lean (saturates-rich) stream to the cracking unit whereby such saturates-rich stream is subjected to increased conversion to higher value desired products.

U.S. Pat. No. 5,643,442 is directed to a process whereby distillate or hydrotreated distillate effluent is separated into an aromatics-rich permeate and an aromatics-lean retentate by use of a permselective membrane with the aromatic-rich permeate being sent to a hydrotreater, thereby increasing the quantity of reduced aromatics content product. The aromatics-lean retentate can be sent downstream and blended into the jet fuel, heating oil or diesel pool.

DESCRIPTION OF THE INVENTION

Figure 1:
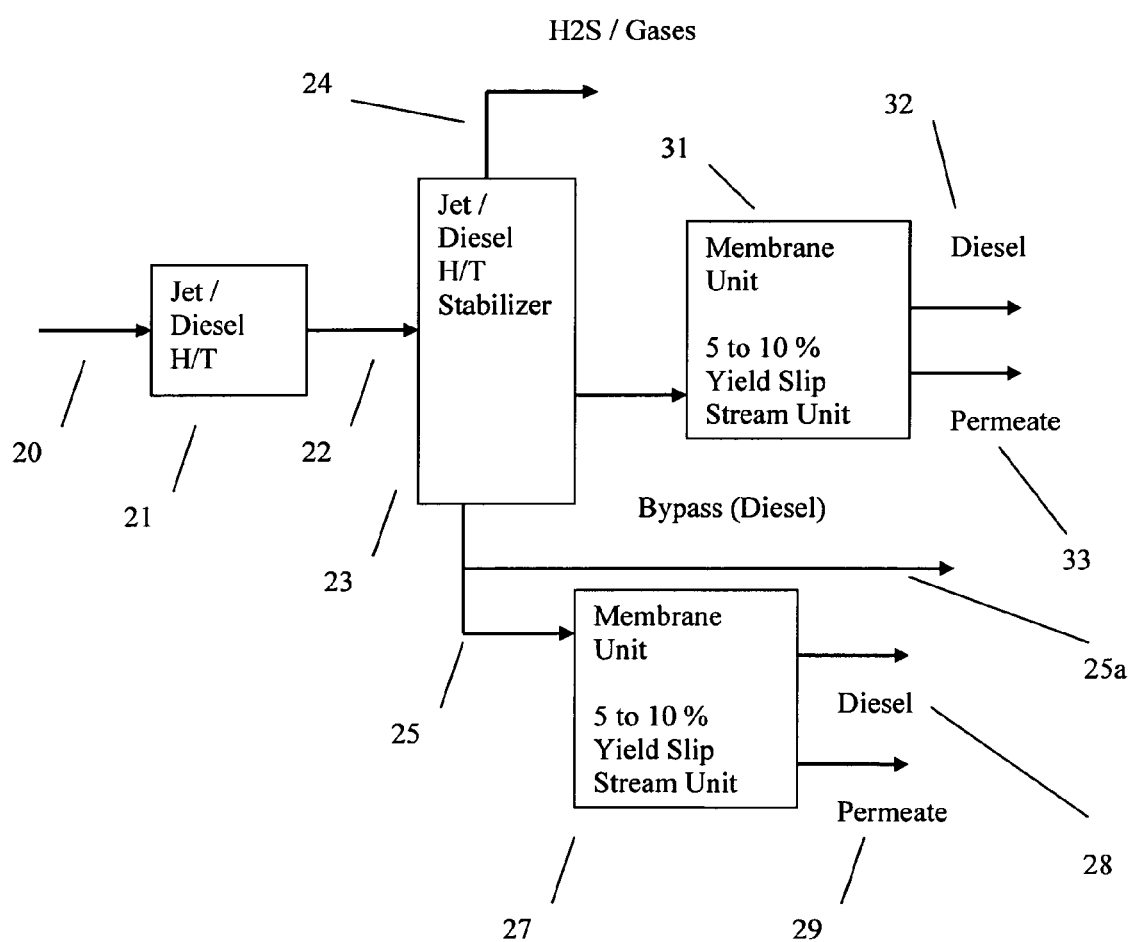
FIG. 1 presents a schematic of an integrated process for the production of enhanced cetane diesel from low quality distillate or diesel boiling feeds by the removal therefrom of minor quantities of $C_6$ to $C_{16}$ aromatics.

The present invention is directed to a process for producing diesel fuel of increased cetane number by subjecting a feed stream boiling in the distillate or diesel boiling range to a membrane separation process using a membrane, preferably a polyester imide membrane, to produce a permeate rich in recovered $C_6$ to $C_{16}$ aromatic molecules and a retentate of reduced aromatics content suitable for use as enhanced cetane diesel or diesel blend stock. The diesel boiling range stream can have a boiling range of from about 250 to about 800° F., preferably from about 325 to about 650° F.

For diesel application, the feed to the membrane is any stream boiling in the distillate or diesel boiling range; e.g., it can be kerosene or diesel or raw kerosene or diesel boiling point materials separated from c rude oils or process streams such as FCC or thermal coking process streams. The feed can be sent to a membrane separation unit employing any of the aromatics/non-aromatics/saturates separation membranes known to those skilled in the art, preferably polyester imide membrane disclosed in U.S. Pat. No. 4,946,594. While any of the membranes of the art capable of separating aromatic hydrocarbons from mixtures of aromatic hydrocarbons and non-aromatic/saturate hydrocarbons can be used in the present invention, certain membranes are preferred. A particularly preferred membrane is described in U.S. Published Application 2008/0035572, published Feb. 14, 2008 directed to a polymeric membrane composition, comprising a dianhydride, a diamine, a cross-linking agent and a difunctional dihydroxy polymer selected from:

a) dihydroxy end-functionalized ethylene propylene copolymers with an ethylene content from about 25 wt % to about 80 wt %;

b) dihydroxy end-functionalized ethylene propylene diene terpolymers with an ethylene content from about 25 wt % to about 80 wt %;

c) dihydroxy end-functionalized polyisoprenes; dihydroxy end-functionalized polybutadienes; dihydroxy end-functionalized polyisobutylenes;

d) dihydroxy end-functionalized acrylate homopolymers, copolymers and terpolymers; dihydroxy end-functionalized methacrylate homopolymers, copolymers and terpolymers; and mixtures thereof;

wherein the mixtures of acrylate and methacrylate monomers range from $C_1$ to $C_{18}$;

e) dihydroxy end-functionalized condensation homopolymers, copolymers, terpolymers and higher order compositions of structurally different monomers, including alcohol-terminated end-functionalized esters and dihydroxy end-functionalized multimonomer polyesters; and mixtures thereof;

wherein the polyalkyladipate structures range from $C_1$ to $C_{18}$;

f) dihydroxy end-functionalized perfluoroelastomers;

g) dihydroxy end-functionalized urethane homopolymers, copolymers, terpolymers, and higher order compositions of structurally different monomers;

h) dihydroxy end-functionalized carbonate homopolymers, copolymers, terpolymers, and higher order compositions of structurally different monomers;

i) dihydroxy end-functionalized ethylene alpha-olefin copolymers, dihydroxy end-functionalized ethylene propylene alpha-olefin terpolymers;

wherein the alpha-olefins are linear or branched and range from $C_3$ to $C_{18}$;

j) dihydroxy end-functionalized styrene homopolymers, copolymers, terpolymers, and higher order compositions of structurally different monomers;

k) dihydroxy end-functionalized silicone homopolymers, copolymers, terpolymers, and higher order compositions of structurally different monomers;

l) dihydroxy end-functionalized styrene butadiene copolymers, dihydroxy end-functionalized styrene isoprene copolymers; and m) dihydroxy end-functionalized styrene butadiene block copolymers; and dihydroxy end-functionalized styrene isoprene block copolymers;

wherein the polymeric membrane is compared of a hard segment and soft segment, wherein the soft segment preferably has a glass transition temperature, Tg, less than 77° F. (25° C.), more preferably less than 32° F. (0° C.), the glass transition temperature of the hard segment, preferably, is greater than 212° F. (100° C.), and the Absorbance Infra-red Spectrum of the membrane has an Aliphatic C—H Area to Aromatic C—H Area ratio of at least 10, the cross-linking agent is selected from diepoxycyclooctane, diepoxyoctane, 1,3-butadiene diepoxide, glycerol diglycidyl ether, bisphenol A diglycidyl ether, 1,4-butanediol diglycidyl ether, 1,4-cyclohexanedimethanol diglycidyl ether, bisphenol F diglycidyl ether, neopentyl glycol diglycidyl ether, poly(propylene glycol) diglycidyl ether, and mixtures there, and the final polymer solution, including the cross-linking agent, is cured at a temperature from about 212° F. to about 480° F. (100° C. to about 250° C.) to form the final polymeric membrane composition.

The membrane can be made as such or can be cast on a supported material comprised of a material selected from polytetrafluoroethylene, aromatic polyamide fiber, porous metal, sintered metal, porous ceramic, polyester, nylon, activated carbon fiber, latex, silicone, polyvinylfluoride, polyvinylidenefluoride, polyurethane, polypropylene, polyethylene, polycarbonate, polysulfone, polyphenylene oxide, metal foam, polymer foam, silica, porous glass, mesh screen, and combinations thereof.

A preferred embodiment of US 2008/0035572 is described in Published Application U.S. 2008/0035571, published Feb. 14, 2008 in which it is taught that the permselective polymeric membrane film sheet of U.S. 2008/0035572 can be cross-linked to another layer of the same or different permselective polymer membrane film. The multiple membrane film sheets can comprise two to ten or more layers and can differ either compositionally (provided they are still selected from the previously recited list) and/or by concentration of the polymers used to produce the different film sheets. The multiple sheets are arranged in at least two adjacent membrane layers which are then chemically cross-linked between the contacting faces of the adjacent permselective polymer membrane layer, thereby forming an integrally layered multi-layer membrane by curing. The adjacent layer can be cross-linked by first forming a first membrane layer drying said first membrane layer to "thick" consistency (dried but not cured, drying it between about 122° F. to 257° F. (50° C. to 125° C.) being typically sufficient), depositing on said first dried but uncured membrane layer a second polymer layer to form an uncured layer membrane and curing the uncured layer membrane at a temperature of from about 212° F. to 482° F. (100° C. to 250° C.) to form the integrally-layered permselective polymeric membrane; in this instance, a two-layer membrane. A membrane of more than two layers can be made by, rather than curing the two-layer system, the two layers are dried (but not cured) and a third layer is deposited. If a three-layer system is desired, following deposition of the third layer the three-layer uncured membrane is cured. If, rather, additional layers are desired, each subsequent layer is deposited on the preceding dried but uncured multi-layer membrane, until the final desired number of layers is deposited. Once the desired number of layers is reached, the uncured multi-layer membrane is cured as previously described.

In the practice of the present invention, because of the possibility that the naphtha feed stream to the membrane might contain measurable quantities of free and/or soluble water and/or free and/or dissolved $O_2$, it is preferred that use be made of the membrane taught in U.S. 2008/0035574 (published Feb. 14, 2008). The preferred membrane comprises at least one permselective polymer membrane element and a hydrophobic and/or vapor barrier film layer, the hydrophobic and/or vapor barrier film layer being oriented on the feed stream side of the permselective polymer membrane element, the hydrophobic and/or vapor barrier being substantially impermeable to water and/or $O_2$. By "substantially impermeable" is meant that the permeate contains less than 25%, preferably less than 10%, more preferably less than 5% by volume of free and/or soluble water and/or free and/or dissolved oxygen as compared to the volume of free and/or soluble water and/or free and/or dissolved oxygen present in the original feed. The permselective polymer membrane element is preferably comprised of a dianhydride, a diamine, a cross-linking agent, and a di functional dihydroxy polymer selected from:

a) dihydroxy end-functionalized condensation homopolymers, copolymers, terpolymers and higher order compositions of structurally different monomers, including alcohol-terminated end-functionalized esters and dihydroxy end-functionalized multimonomer polyesters; and mixtures thereof;

wherein the polyalkyladipate structures range from $C_1$ to $C_{18}$; and b) dihydroxy end-functionalized urethane homopolymers, copolymers, terpolymers, and higher order compositions of structurally different monomers;

while the hydrophobic and/or vapor barrier is a film comprised of a compound selected from polytetrafluoroethylene, polyvinylfluoride, polyvinylidenefluoride, polypropylene, polyethylene, polycarbonate, polysulfone, silicone, or a film membrane layer comprised of a dianhydride, a diamine, a cross-linking agent, and a difunctional dihydroxy polymer selected from:

a) dihydroxy end-functionalized ethylene propylene copolymers with an ethylene content from about 25 wt % to about 80 wt %;

b) dihydroxy end-functionalized ethylene propylene copolymers with an ethylene content from about 25 wt % to about 80 wt %;

c) dihydroxy end-functionalized acrylate homopolymers, copolymers and terpolymers; dihydroxy end-functionalized methacrylate homopolymers, copolymers and terpolymers; and mixtures thereof, wherein the mixtures of acrylate and methacrylate monomers range from $C_1$ to $C_{18}$;

d) dihydroxy end-functionalized perfluoroelastomers;

e) dihydroxy end-functionalized carbonate homopolymers, copolymers, terpolymers, and higher order compositions of structurally different monomers;

f) dihydroxy end-functionalized ethylene alpha-olefin copolymers; dihydroxy end-functionalized propylene alpha-olefin copolymers; and dihydroxy end-functionalized ethylene propylene alpha-olefin terpolymers;

wherein the alpha-olefins are linear or branched and range from $C_3$ to $C_{18}$;

g) dihydroxy end-functionalized styrene homopolymers, copolymers, terpolymers, and higher order compositions of structurally different monomers; and h) dihydroxy end-functionalized silicone homopolymers, copolymers, terpolymers, and higher order compositions of structurally different monomers.

The hydrophobic and/or vapor barrier film is as previously stated, on the feed side of the permselective polymer membrane. The barrier film can be employed as a separate sheet situated on the feed side of the permselective polymer membrane or can be directly coated onto the permselective polymer membrane as an integral layer by being sprayed on or vacuum-induced onto the permselective polymer membrane layer, or by any other known coating procedure.

Another membrane system preferably used in the present invention is described in Published U.S. Application 2008/0035566, published Feb. 14, 2008 which teaches a multi-layer membrane system comprised of at least two permselective polymer membrane layers and at least two polymer film layers wherein at least one permselective polymeric membrane layer is comprised of a dianhydride, a diamine, a cross-linking agent and a difunctional dihydroxy polymer wherein the difunctional dihydroxy polymer and the cross-linking agents are selected from the group recited in U.S. 2008/0035572. In U.S. 2008/0035566 the permselective membrane layer is formed on a support material, then has a polymer film layer of the type recited in Published U.S. Application 2008/0035574 deposited on the feed side face of the permselective membrane. In a preferred embodiment of U.S. 2008/0035574, a support material is coated both front and back with two or more integral layers of permselective polymeric membrane material, the multiple integral layers being deposited and cured as taught in U.S. 2008/0035571. This cured dual side deposited membrane element can be coated, front and back, with the polymer film layers. Alternatively, two or more of the cured dual side deposited membrane element can be formed into a stack, then have a film layer placed or deposited on the front and back faces of the stack. Such a stack element can be engineered, depending on the number of cured dual side deposited membrane elements employed, to exhibit selectively for particular different carbon number aromatics in the permeate; e.g., lower carbon number aromatics can be excluded from the permeate while higher carbon number aromatics selectively permeate through the membrane element and resulting in a higher concentration/distribution of the higher carbon number aromatics in the permeate as compared to the concentration/distribution of such aromatics in the feed stream, based on the total concentration of aromatics.

Separation in the membrane separation unit can be conducted under either perstraction or pervaporation conditions. Perstraction involves the selective dissolution of particular components contained in a mixture into the membrane, the diffusion of those components through the membrane and the removal of the diffused components from the downstream side of the membrane by use of a liquid sweep stream. In the perstractive separation of aromatics from saturates in petroleum or chemical streams (particularly heavy cat naphtha streams) the aromatic molecules present in the feed stream dissolve into the membrane film due to similarities between the membrane solubility parameter and the solubility parameter of the aromatic species in the feed. The aromatics then permeate (diffuse) through the membrane and are swept away by a sweep liquid which is low in aromatics content. This keeps the concentration of aromatics at the permeate side of the membrane film low and maintains the concentration gradient which is responsible for the permeation of the aromatics through the membrane.

The sweep liquid is low in aromatics content so as not to itself decrease the concentration gradient. The sweep liquid is preferably a saturated hydrocarbon liquid with a boiling point much lower or much higher than that of the permeated aromatics. This is to facilitate separation, as by simple distillation. Suitable sweep liquids, therefore, would include, for example, low boiling $C_3$ to $C_6$ saturated hydrocarbons and high boiling lube base stocks ($C_{15}$ to $C_{20}$).

The perstraction process is run at any convenient temperature, preferably as low as possible.

The choice of pressure is not critical since the perstraction process is not dependent on pressure, but on the ability of the aromatic components in the feed to dissolve into and migrate through the membrane under a concentration driving force. Consequently, any convenient pressure may be employed, the lower the better to avoid undesirable compaction, if the membrane is supported on a porous backing, or rupture of the membrane, if it is not.

Pervaporation, by comparison, is run at generally higher temperatures than perstraction and relies on vacuum on the permeate side to evaporate the permeate from the surface of the membrane and maintain the concentration gradient driving force which drives the separation process. As in perstraction, the aromatic molecules present in the feed dissolve into the membrane film, migrate through said film and re-emerge on the permeate side under the influence of a concentration gradient. Pervaporation separation of aromatics from saturates can be performed at a temperature of about 25° C. for the separation of benzene from hexane but for separation of heavier aromatic/saturate mixtures, such as heavy cat naphtha, higher temperatures of at least 80° C. and higher, preferably at least 100° C. and higher, more preferably 120° C. and higher should be used. The maximum upper temperature limit is that temperature at which the membrane is physically damaged or delaminates. Vacuum on the order of 1 to 50 mm Hg is pulled on the permeate side. The vacuum stream containing the permeate is cooled to condense out the highly aromatic permeate. Condensation temperature should be below the dew point of the permeate at a given vacuum level.

The membrane itself may be in any convenient form utilizing any convenient module design. Thus, sheets of membrane material may be used in spiral wound or plate and frame permeation cell modules. Tubes and hollow fibers of membranes may be used in bundled configurations with either the feed or the sweep liquid (or vacuum) in the interior space of the tube or fiber, the complimentary environment obviously being maintained on the other side.

In the membrane separation unit the feed is separated into an aromatics-rich/saturates-lean permeate which can be used as a gasoline blend stock stream of increased octane rating due to the increased aromatics hydrocarbon content. The retentate stream being of reduced aromatics content/increased non-aromatics-saturates content is a diesel of improved cetane rating.

In the present invention a diesel fuel or diesel blend stock of increased cetane number is produced by subjecting a feed boiling in the distillate or diesel boiling range to a membrane separation process employing a membrane wherein the feed is separated into an aromatics-lean retentate suitable for use as diesel fuel or blend stock of increased cetane rating because of the removal from the feed of light aromatic materials between $C_6$ to $C_{16}$ which are recovered in the permeate from the separation. By the practice of this process, crudes which have poor quality diesel fractions and are traded at a discount can now be economically upgraded to quality diesel fuels and blend fractions by the removal of aromatic materials which have poor cetane quality. In the process a typical low quality diesel and/or jet fuel distillate fraction is sent to a jet/diesel hydrotreater to remove any sulfur or nitrogen containing compounds, the effluent from the hydrotreater being sent to a hydrotreater stabilizer unit. The stabilizer is a distillation tower that removes light gases ($H_2$, $C_1$ to $C_5$) from the hydrotreated product. The liquid effluent from the stabilizer is diesel fuel or blend stock. The cetane value of the diesel fuel or blend stock made from low quality naphthenic crudes can be improved by sending all or a part of the liquid effluent to a membrane separation unit wherein aromatic hydrocarbons in the $C_6$ to $C_{16}$ range are removed as permeate suitable for use as gasoline or gasoline blend stock or heating oil, leaving a retentate of reduced aromatics content/increased cetane value.

The stream from the stabilizer can be either the entire recovered liquid bottoms from the stabilizer or a light side stream fraction boiling in the 320 to 450° F. range can be drawn off from the unit and itself sent to a separate membrane separation unit for production of an aromatics-lean retentate constituting an enhanced cetane diesel fuel or diesel blend fraction and an aromatics-rich permeate which can be used as motor gasoline or heating oil.

EXAMPLES

In FIG. 1, a distillate or fraction boiling in the diesel boiling range secured from crudes which have poor quality diesel fractions due to low cetane can be employed as the feed stock.

The distillate feed is fed via line (20) into a jet/diesel hydrotreater (21), the effluent from unit (21) being fed via line (22) into a jet/diesel hydrotreater stabilizer (23). Gaseous off gases and hydrogen are recovered via line (24). The total liquid effluent from unit (23) is recovered via line (25). This total liquid effluent can be used as such and recovered via line (25a) as diesel/jet fuel and sent to the diesel/jet pool. This is the current stream handling set. In the present invention, all or a part of the effluent from unit (23) can be fed via line (25) into membrane separation unit (27) wherein a minor fraction of the $C_6$ to $C_{16}$ aromatic hydrocarbons in the stabilizer effluent in line (25) is separated as permeate recoverable as motor gasoline or heating oil via line (29). Retentate of reduced aromatics content is recovered via line (28) as enhanced cetane diesel fuel or blending stock. It can be employed or stored as such (not shown) or blended with the diesel fuel in line (25a). Optionally or additionally, a light side stream boiling in the 320 to 450° F. range can be recovered from stabilizer (23) via line (30) and sent to separate membrane separation unit (31) wherein a permeate of enhanced $C_6$ to $C_{16}$ aromatics content is recovered via line (33) for use as motor gasoline or gasoline blend stock or heating oil. The retentate of reduced $C_6$ to $C_{16}$ aromatics content is recovered via line (32) and used as diesel/jet or diesel/jet blend stocks. It can be used or stored separately (not shown) or mixed with the diesel/jet fuel from stabilizer (32) in line (25a).

What is claimed is:

1. A method for improving the cetane rating of distillate and diesel boiling range fractions by subjecting a feed stream derived from a naphthenic crude boiling in the distillate or diesel boiling range to a membrane separation process to produce a permeate rich in recovered $C_6$ to $C_{16}$ aromatic materials and a retentate of reduced $C_6$ to $C_{16}$ aromatics content suitable for use as enhanced cetane diesel or diesel blend stock, wherein the membrane separation process employs a membrane formed from a dianhydride, a diamine, an epoxy cross-linking agent, and a difunctional dihydroxy polymer, optionally cast on a support material.

2. The method of claim 1 wherein the feed stream is kerosene, diesel, raw kerosene or diesel boiling point materials separated from crude oils, or process streams.

3. The method of claim 1 wherein the process streams from which the feed stream is obtained are fluid cat cracking process streams and thermal coking process streams.

4. The method of claim 1 wherein the feed stream boiling in the distillate or diesel boiling range is sent to a hydrotreater to produce a hydrotreated stream, the hydrotreated stream is sent to a hydrotreater stabilizer unit, and all or part of the effluent from the hydrotreater stabilizer unit is sent to the membrane separation process.

5. The method of claim 4 wherein a stream boiling in the range of 320 to 450° F. is withdrawn from the hydrotreater stabilizer unit and separately sent to a separate membrane separation process producing an aromatics-lean retentate stream constituting an enhanced cetane diesel fuel or diesel blending fraction and aromatics-rich permeate constituting motor gasoline or heating oil.

6. The method of claim 1 wherein the epoxy cross-linking agent is selected from diepoxycyclooctane, diepoxyoctane, 1,3-butadiene diepoxide, glycerol diglycidyl ether, bisphenol A digylcidyl ether, 1,4-butanediol diglycidyl ether, bisphenol F diglycidyl ether neopentyl glycol diglycidyl ether, poly (propylene glycol) diglycidyl ether, and mixtures thereof.

7. The method of claim 6 wherein the epoxy cross-linking agent is diepoxycyclooctane, and wherein the four membrane components are cured at a temperature from about 212° F. to about 480° F. to form the membrane.

8. The method of claim 1 wherein membrane, as formed, has an absorbance infra-red spectrum with a aliphatic C—H peak area and an aromatic C—H peak area, such that a ratio of the aliphatic C—H peak area and the aromatic C—H peak area is at least 10.

9. The method of claim 1 wherein the support material is present and is selected from polytetrafluoroethylene, aromatic polyamide fiber, porous metal, sintered metal, porous ceramic, polyester, nylon, activated carbon fiber, latex, silicone, polyvinyl fluoride, polyvinylidene fluoride, polyurethane, polypropylene, polyethylene, polycarbonate, polysulfone, polyphenylene oxide, metal foam, polymer foam, silica, porous glass, mesh screen, and combinations thereof.

* * * * *